United States Patent
Ishii

(10) Patent No.: US 11,135,886 B2
(45) Date of Patent: Oct. 5, 2021

(54) VEHICLE

(71) Applicant: KAWASAKI JUKOGYO KABUSHIKI KAISHA, Kobe (JP)

(72) Inventor: Hiroshi Ishii, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 67 days.

(21) Appl. No.: 16/689,467

(22) Filed: Nov. 20, 2019

(65) Prior Publication Data

US 2020/0164707 A1 May 28, 2020

(30) Foreign Application Priority Data

Nov. 22, 2018 (JP) .............................. JP2018-219294

(51) Int. Cl.
*B60G 7/00* (2006.01)
*B60G 15/06* (2006.01)
*B60G 21/00* (2006.01)
*B62D 1/04* (2006.01)
(Continued)

(52) U.S. Cl.
CPC ........... *B60G 7/006* (2013.01); *B60G 15/062* (2013.01); *B60G 21/002* (2013.01); *B62D 1/04* (2013.01); *B62D 1/16* (2013.01); *B62K 5/10* (2013.01); *B60G 2200/144* (2013.01); *B60G 2202/12* (2013.01); *B60G 2204/124* (2013.01); *B60G 2204/143* (2013.01)

(58) Field of Classification Search
CPC .... B60G 7/006; B60G 15/062; B60G 21/002; B60G 2200/144; B60G 2202/12; B60G 2204/124; B60G 2204/143; B60G 2400/051; B60G 2400/63; B60G 2300/122; B60G 3/20; B62K 5/10; B62D 1/04; B62D 1/16
See application file for complete search history.

(56) References Cited

U.S. PATENT DOCUMENTS 2,116,027 A 5/1938 Kolbe
7,552,790 B2 * 6/2009 Dower .................... B62D 9/02
180/210

(Continued)

FOREIGN PATENT DOCUMENTS

EP 3069979 9/2016
JP 05270233 10/1993
WO 2005/058620 6/2005

*Primary Examiner* — Drew J Brown
(74) *Attorney, Agent, or Firm* — Fay Kaplun & Marcin, LLP

(57) ABSTRACT

A vehicle includes a front wheel, a front wheel mounting portion, a vehicle body, and a roll mechanism. The wheels are disposed in a pair of the left and right and rotatable about the steering shaft as a rotation center. The portion is disposed in a pair of left and right, and the wheel rotatably mounted and includes a suspension. The body includes a seat on which an occupant sits. The mechanism connects the body and the portion. In the upright state, the roll axis of the mechanism is located at a position higher than the vehicle center of gravity when the occupant is not riding. When the body receives a centrifugal force at the time of turning, only the body among the body and the wheel rolls around the roll axis as the rotation center, whereby the body is inclined inward in the turning direction.

13 Claims, 7 Drawing Sheets

(51) Int. Cl.
  *B62D 1/16* (2006.01)
  *B62K 5/10* (2013.01)

(56) References Cited

U.S. PATENT DOCUMENTS

| | | | |
|---|---|---|---|
| 8,376,384 B2 * | 2/2013 | Tsai | B62H 1/12 |
| | | | 280/293 |
| 10,486,747 B2 * | 11/2019 | Casgrain | B62D 27/04 |
| 2008/0223637 A1 | 9/2008 | Bartilson | |
| 2016/0137251 A1 * | 5/2016 | Mercier | B62D 9/02 |
| | | | 180/210 |
| 2017/0305222 A1 * | 10/2017 | Preijert | B60G 13/005 |
| 2018/0222276 A1 * | 8/2018 | Kimura | B60G 21/05 |
| 2018/0264905 A1 * | 9/2018 | Kimura | B60G 17/0182 |
| 2018/0281886 A1 * | 10/2018 | Mizuno | B60W 30/045 |
| 2019/0144035 A1 * | 5/2019 | Doerksen | B60G 17/0162 |
| | | | 280/124.103 |
| 2020/0102037 A1 * | 4/2020 | Hirayama | B62D 9/02 |
| 2020/0207436 A1 * | 7/2020 | Hu | B62K 5/027 |
| 2021/0001946 A1 * | 1/2021 | Choi | B62K 21/08 |

* cited by examiner

VEHICLE

FIELD OF THE INVENTION

The present invention generally relates to a vehicle in which front wheels are disposed in a pair of left and right, and in which the front wheels can be steered.

BACKGROUND

Patent Document 1 (Japanese Patent Application Laid-Open No. 5-270233) discloses a vehicle having front wheels disposed in a pair of left and right. When the driver rotates the steering handle, the pair of left and right front wheels rotates about the steering shaft. This makes it possible to turn the vehicle.

SUMMARY

In general, the driver of a vehicle of this type receives a force (centrifugal force) in a direction opposite to the turning direction at the time of turning.

Thus, the driver exerts a force to prevent the body from moving out of the seat when turning. Conventional vehicles have room for improvement in terms of driver's comfort when turning.

The present invention relates to a vehicle capable of reducing a load on a driver by suppressing an influence of a force applied to the driver at the time of turning.

An aspect of the present invention provides a vehicle configured as follows. The vehicle includes front wheels, front wheel mounting portions, a vehicle body, and a roll mechanism. The front wheels comprise a pair of left and right front wheels, and each of the front wheels are rotatable about the steering shaft as a rotation center. The front wheel mounting portions comprise a pair of left and right front wheel mounting portions. The front wheel mounting portions are rotatably mounted with the wheels and the front wheel mounting portions include a suspension. The vehicle body includes a seat on which an occupant sits. The roll mechanism connects the vehicle body and the front wheel mounting portions.

When the vehicle stands upright, the roll axis of the roll mechanism is located at a position higher than the center of gravity of the vehicle on which the occupant is not riding. When only the vehicle body among the vehicle body and the front wheels rotates around the roll axis as a rotation center by receiving centrifugal force at the time of turning of the vehicle whereby the vehicle body is inclined inward in the turning direction.

Since the roll axis is located at a position higher than the center of gravity of the vehicle in this manner, the vehicle body is inclined inward in the turning direction when the vehicle turns. Therefore, it is possible to suppress the influence of the force received by the driver at the time of turning. As a result, the burden on the driver at the time of turning can be reduced.

The present invention can provide a vehicle capable of reducing a load on a driver by suppressing an influence of a force applied to the driver at the time of turning.

DETAILED DESCRIPTION

Figure 1:
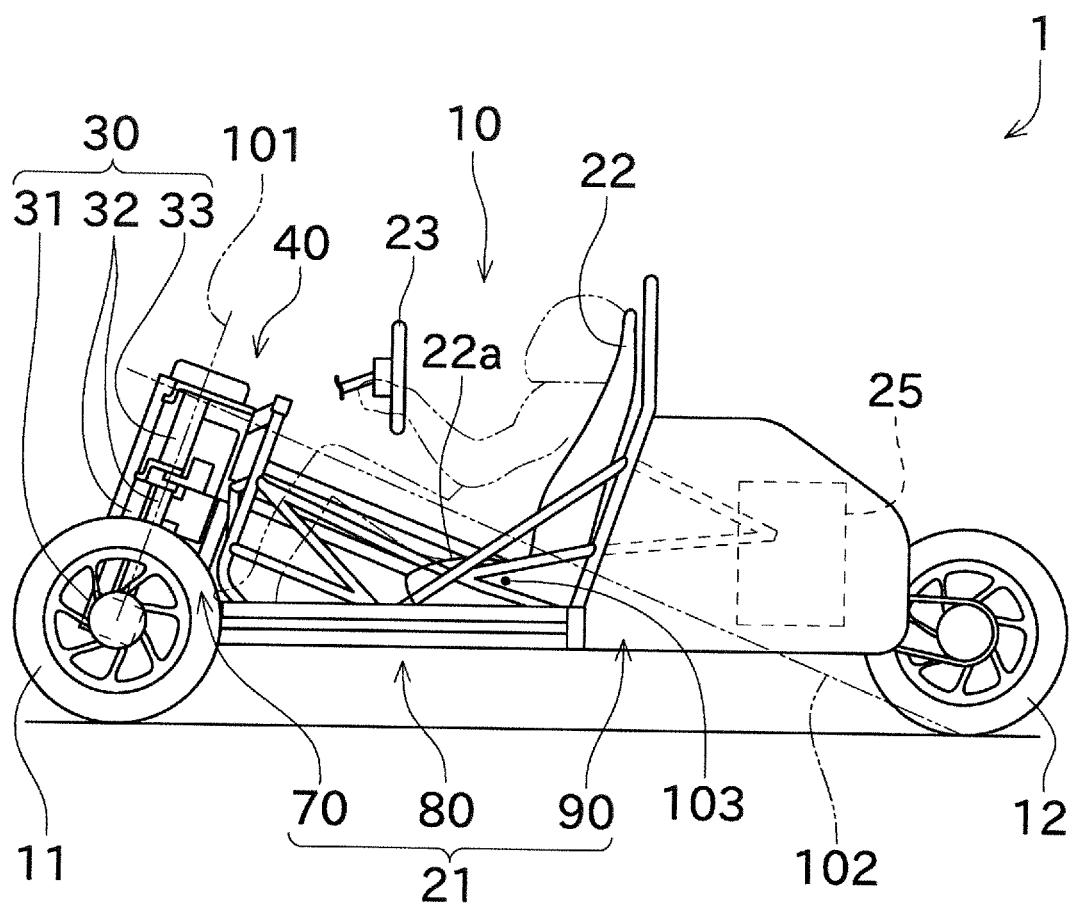
FIG. 1 is a side view of a vehicle according to an embodiment of the present invention.
Figure 2:
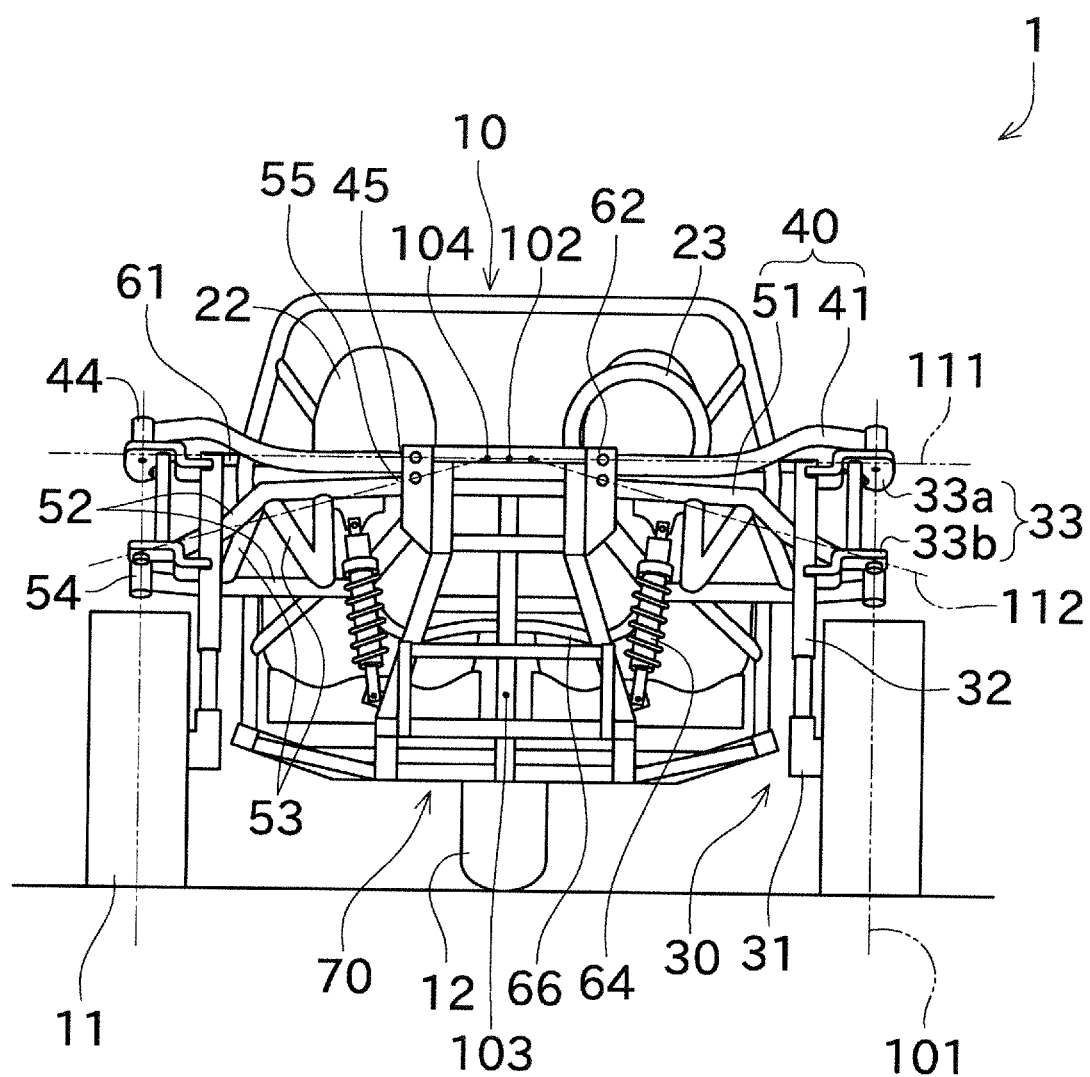
FIG. 2 is a front view of the vehicle.
Figure 3:
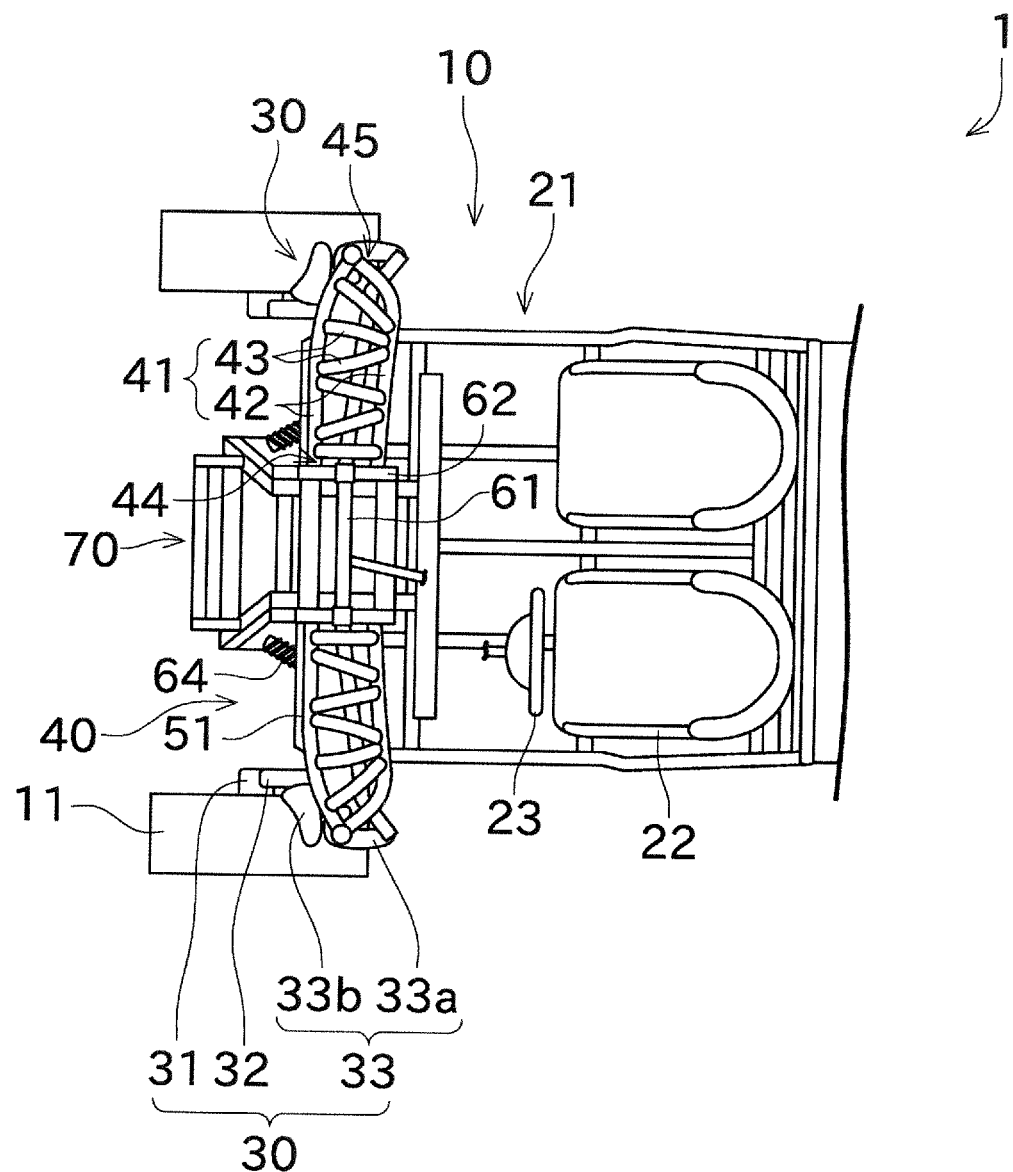
FIG. 3 is a plan view of the vehicle.
Figure 4:
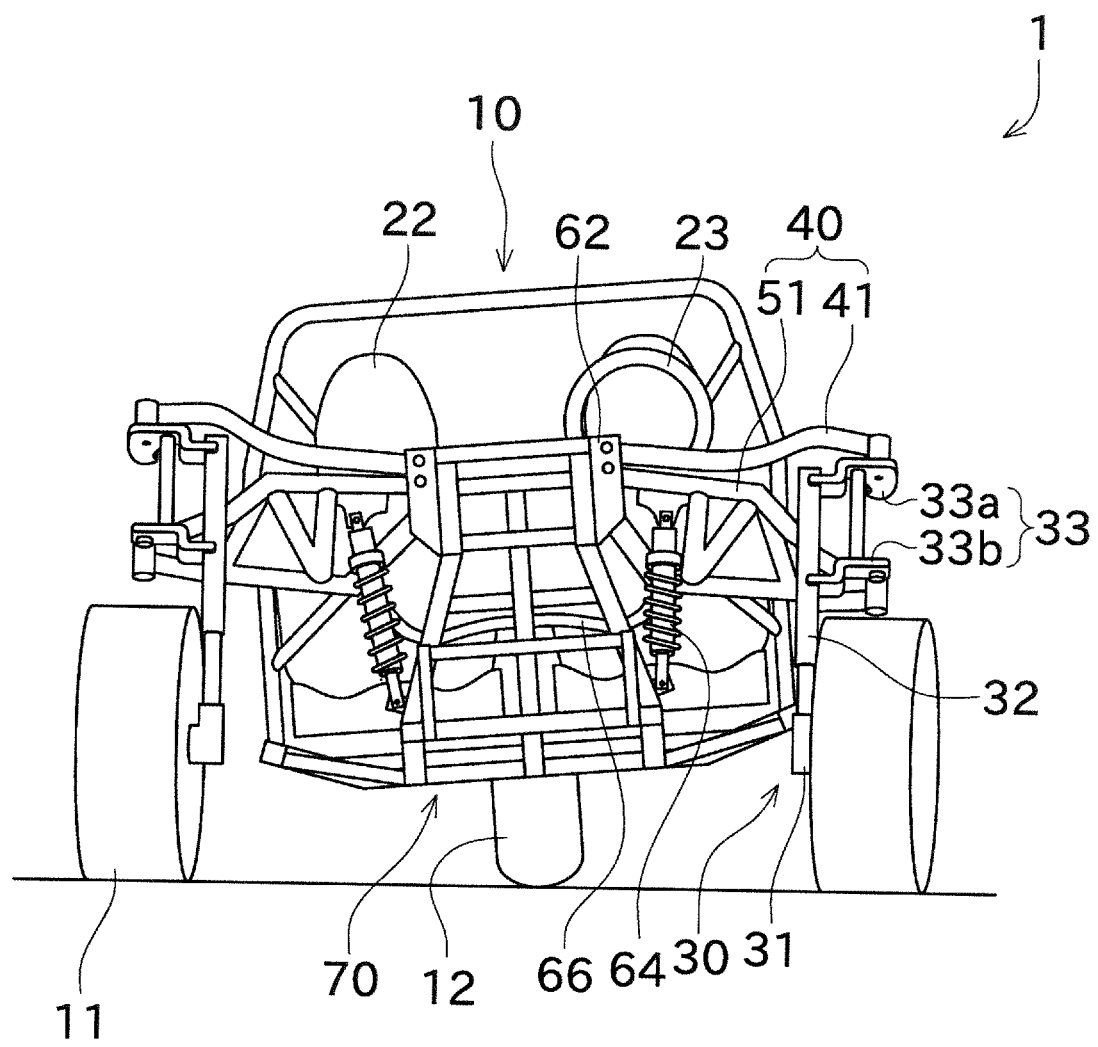
FIG. 4 is a front view showing a state in which the vehicle body of the vehicle is inclined at the time of turning.

Exemplary embodiments of the present invention will be described with reference to the drawings. FIG. 1 is a side view of a vehicle 1 according to an embodiment of the present invention. FIG. 2 is a front view of the vehicle 1. FIG. 3 is a plan view of the vehicle 1. FIG. 4 is a front view showing a state in which the vehicle body 10 of the vehicle 1 is inclined at the time of turning.

In the following description, front-back, up-down and left-right directions are defined that directions as seen from a driver who rides on the vehicle 1. The left-right direction may also be defined as a vehicle width direction of the vehicle 1. The front-rear direction may also be defined as a vehicle length direction of the vehicle 1. Also, the terms describing the positional relationship (parallel, vertical, horizontal, etc.) include the meaning of a substantial positional relationship (substantially parallel, substantially vertical, substantially horizontal, etc.).

The vehicle 1 can be ridden by at least driver. The vehicle 1 is configured to turn when the driver performs steering. In the vehicle 1, there are portions in which the body shell (e.g., the front panel, the door, the roof panel, and the like), the glass member (e.g., the front glass, the door glass, the rear glass, and the like) and the like are not described in the drawings. However, the vehicle 1 may have such a configuration. As shown in FIG. 1, a vehicle 1 includes a vehicle body 10, front wheels 11, and a rear wheel 12.

The front wheel 11 is mounted to the vehicle body 10 via a front wheel mounting portion 30, which will be described later. A rear wheel 12 is mounted to the vehicle body 10. When the vehicle 1 turns, the vehicle body 10 is inclined inward in the turning direction with respect to the road surface, i.e., toward the center of the arc drawn by the turning. Details of the vehicle body 10 will be described later.

The front wheels 11 are disposed in a left-right pair. The front wheel 11 includes a wheel body and a tire mounted to the wheel body. Unlike the vehicle body 10, the front wheel 11 maintains an upright position when the vehicle 1 turns (does not tilt inward in the turning direction with respect to the road surface). In other words, the vehicle 1 does not have a mechanism for tilting the front wheel 11 when turning. "Maintaining upright (not tilted)" means substantially not tilting (hardly tilting) when turning. Thus, a slight tilting of the front wheel 11 during a turn, e.g. due to rattling of the mechanism or local deformation of the front wheel 11, corresponds to "maintaining upright".

One rear wheel 12 is disposed at the center in the vehicle width direction. The rear wheel 12 includes a wheel body and a tire mounted to the wheel body. Unlike the front wheel 11, the rear wheel 12 is inclined inward in the turning direction with respect to the road surface when the vehicle 1 turns. Therefore, when the vehicle 1 turns, the vehicle body 10 and the rear wheel 12 are integrally inclined, and the front wheel 11 is maintained upright. Therefore, the tire of the front wheel 11 of the present embodiment has a substantially rectangular shape when viewed from the front (in other words, the front wheel 11 has the same shape as that of a tire of an automobile). On the other hand, in the tire of the rear wheel 12, a part of the upper end and a part of the lower end are arc-shaped in the front view (in other words, the rear tire have the same shape as a tire of the motorcycle). As a result, the contact area between the tire of the rear wheel 12 and the road surface can be secured even if the rear wheel 12 is inclined. The shape of the tire of the present embodiment is an example, and the tire of the front wheel 11 may have the same shape as the tire of the rear wheel 12.

The rear wheels 12 may be disposed in a left-right pair. In this case, the rear wheel 12 may be mounted to the vehicle body 10 via the same mechanism as the front wheel 11, i.e., a mechanism that does not tilt together with the vehicle body 10. As a result, not only the front wheel 11 but also the rear wheel 12 can be maintained upright when the vehicle 1 turns. As described above, the number of wheels of the vehicle 1 is not limited to three and may be four or more.

The vehicle body 10 includes a frame 21, seats 22, and a steering handle 23. The frame 21 has a structure in which a plurality of pipe materials are connected by welding, fixing tools, or the like. Various components of the vehicle 1 are mounted to the frame 21. The details of the frame 21 will be described later.

The seats 22 are disposed in a pair of the left and right, one for the driver and the other for the passenger. A steering handle 23 is disposed in front of the driver's seat 22. A lever or pedal (not shown) is disposed around the steering handle 23. The driver performs steering by rotating the steering handle 23 while sitting on the seat 22. More specifically, the operating force applied by the driver to the steering handle 23 is transmitted to the front wheel 11, so that the front wheel 11 rotates about the steering shaft 101. Only one seat 22 for the driver may be disposed on the vehicle 1. The sheet 22 may be disposed on either of the left and right sides. The seat 22 may be disposed at the center in the vehicle width direction. The sheets 22 may be disposed side by side.

An engine 25 as a drive source is disposed behind the seat 22. The engine 25 drives the drive wheel that is the rear wheels 12 in this embodiment. The engine 25 is, for example, a gasoline engine. A driving force generated by the engine 25 is transmitted to the rear wheel 12 via a transmission mechanism such as a drive chain after being shifted by a transmission gear (not shown). However, instead of or in addition to the engine 25, an electric motor for generating a driving force for traveling the vehicle 1 may be disposed. The engine 25 is not limited to the rear of the seat 22, but may be disposed in front of the seat 22.

Next, a detailed description will be given of a mechanism for tilting the vehicle body 10 while the front wheel 11 is upright at the time of turning, specifically, the front wheel mounting portion 30, the roll mechanism 40, and the like. The front wheel mounting portions 30 are disposed in a pair of left and right. The left front wheel mounting portion 30 is mounted to the left front wheel 11. The right front wheel mounting portion 30 is mounted to the right front wheel 11. Since the shape and the configuration of the front wheel mounting portions 30 are symmetrical, the left and right front wheel mounting portions 30 will be collectively described below.

As shown in FIG. 2, the front wheel mounting portion 30 includes a knuckle member 31, a suspension 32, and a first end mounting portion 33.

The knuckle member 31 is mounted to the inside of the front wheel 11 in the vehicle width direction. The knuckle member 31 is configured to rotate integrally with the front wheel 11 about the steering shaft 101.

The suspension 32 is mounted to the front wheel 11 via a knuckle member 31. The suspensions 32 are disposed in an inclined orientation such that the suspensions 32 approach the front as they approach the lower side. The longitudinal direction of the suspension 32 is parallel to the steering shaft 101. The suspension 32 of the present embodiment is a telescopic type two front fork. The front forks are disposed side by side in the vehicle length direction. The inner tube and the outer tube of the front fork are connected via a spring. Therefore, the front fork expands and shrinks in response to vibration from the road surface. The knuckle member 31 is mounted to a suspension 32, in particular, on the side closer to the road surface than the spring.

In order to prevent the inner tube and the outer tube from rotating relative to each other, the suspension 32 preferably includes two front forks. However, the suspension 32 may comprise a single front fork. The suspension 32 is not limited to a telescopic type front fork, and may be another type of suspension, for example, a bottom link type suspension.

The first end mounting portion 33 is mounted to the suspension 32, more specifically, on the side closer to the vehicle body 10 than the spring. The first end mounting portion 33 includes an upper mounting plate 33a and a lower mounting plate 33b. The upper mounting plate 33a and the lower mounting plate 33b are connected by a shaft. Therefore, the upper mounting plate 33a and the lower mounting plate 33b move integrally. The upper mounting plate 33a is mounted to the upper portion of the suspension 32. The lower mounting plate 33b is mounted to an intermediate portion of the suspension 32. The upper mounting plate 33a and the lower mounting plate 33b are configured to extend outward in the vehicle width direction from the mounting position with respect to the suspension 32. The upper mounting plate 33a and the lower mounting plate 33b are disposed at positions overlapping with the front wheel 11 (in particular, the center of the front wheel 11 in a plan view such as FIG. 3) and at positions higher than the front wheel 11. In other words, the upper mounting plate 33a and the lower mounting plate 33b are disposed at positions where the steering shaft 101 passes therethrough. Therefore, the upper mounting plate 33a and the lower mounting plate 33b are configured to be rotatable about the steering shaft 101.

The knuckle member 31, the suspension 32, and the first end mounting portion 33 are fixed so as not to rotate relative to each other about the steering shaft 101. Accordingly, the knuckle member 31, the suspension 32, and the first end mounting portion 33 rotate integrally with the front wheel 11. As a result, the front wheel mounting portion 30 can transmit the operating force of the driver to the front wheel 11 to rotate the front wheel 11 about the steering shaft 101.

The first end mounting portion 33 is not limited to a configuration in which it is directly mounted to the suspension 32. The first end mounting portion 33 may be mounted to the suspension 32 (a portion closer to the vehicle body 10 than the spring) via another member.

The operating force applied to the steering handle 23 by the driver is transmitted to the upper mounting plate 33a. Specifically, the rotational motion of the steering handle 23 is converted into a linear motion of the steering transfer unit 61 (FIG. 3) in the vehicle width direction by a rack and pinion mechanism (not shown) or the like. The steering transfer unit 61 includes a plurality of rods and a pillow ball joint or the like for connecting the plurality of rods. The left end of the steering transfer unit 61 is rotatably mounted to a first end mounting portion 33 on the left side, which is a portion different from the steering shaft 101. The right end of the steering transfer unit 61 is rotatably mounted to a first end mounting portion 33 on the right side, which is a portion different from the steering shaft 101. When the steering transfer unit 61 performs a linear motion in the vehicle width direction, the left and right first end mounting portions 33 rotate about the steering shaft 101 as a rotation center. As a result, the front wheel 11 can be rotated about the steering shaft 101.

The roll mechanism 40 connects the vehicle body 10 and the front wheel mounting portion 30. As shown in FIG. 2 and FIG. 3, the roll mechanism 40 includes a pair of left and right upper arms 41 and a pair of left and right lower arms 51. The upper arm 41 on the left side and the lower arm 51 on the left side are connected to the front wheel mounting portion 30 on the left side. The upper arm 41 on the right side and the lower arm 51 on the right side are connected to the front wheel mounting portion 30 on the right side. Therefore, the vehicle body 10 and the front wheel mounting portion 30 are connected by four arms. The shape of the upper arm 41 is symmetrical. The shape of the lower arm 51 is also symmetrical. Therefore, the left and right arms will be collectively described below.

As shown in FIG. 3, the upper arm 41 includes a plurality of connecting portions 42 and a plurality of reinforcing portions 43. The outer end portion of the upper arm 41 in the vehicle width direction is defined as a first end portion 44. An end portion of the upper arm 41 on the center side in the vehicle width direction is defined as a second end portion 45.

The connecting portion 42 is an elongated pipe material. The vehicle 1 of the present embodiment includes two connecting portions 42. The two connecting portions 42 are disposed at intervals in the vehicle length direction. At the first end portion 44, the two connecting portions 42 merge. At the first end portion 44, two connecting portions 42 are mounted to the first end mounting portion 33, i.e., the upper mounting plate 33a. The connection portion 42 and the upper mounting plate 33a are mounted at positions corresponding to the steering shaft 101. The connecting portion 42 and the upper mounting plate 33a are coupled to each other so as to be rotatable relative to each other about the steering shaft 101. At the second end portion 45, the two connecting portions 42 are mounted to a member on the vehicle body 10 side, i.e., the second end mounting portion 62, in a state in which the two connecting portions 42 are spaced apart in the vehicle length direction. The connecting portion 42 and the second end mounting portion 62 are coupled to each other so as to be relatively rotatable about a predetermined direction (more specifically, a direction orthogonal to the steering shaft 101 in a side view).

At least a part of the steering transfer unit 61 is disposed between the two connecting portions 42. Specifically, in a plan view, at least a part of the steering transfer unit 61 is disposed between the two connecting portions 42. In a front view, at least one of the two connecting portions 42 and at least a part of the steering transfer unit 61 are disposed so as to overlap with each other. As a result, the position of the upper arm 41 and the position of the steering transfer unit 61 can be prevented from overlapping with each other. Further, in a front view, a first imaginary straight line 111 (FIG. 2) connecting a first mounting point and a second mounting point is horizontal. The first mounting point is a point where the upper arm 41 is mounted to the upper mounting plate 33a. The second mounting point is a point where the upper arm 41 is mounted to the second end mounting portion 62. At least a part of the steering transfer unit 61 and the rotation axis of the pillow ball joint are provided on the first imaginary straight line 111. Therefore, even if the vehicle body 10 tilts when the steering handle 23 is neutral, the steering transfer unit 61 does not easily rotate the upper mounting plate 33a. As a result, an unnecessary change in the steering angle of the front wheel 11 is suppressed.

The reinforcing portion 43 connects two connecting portions 42 that are spaced apart, in particular, intermediate portions of the connecting portion 42. At least a part of the reinforcing portion 43 is curved so as to be convex upward. As a result, since the reinforcing portion 43 does not obstruct the space sandwiched between the two connecting portions 42, for example, the disposal of the steering transfer unit 61 becomes easy.

The lower arm 51 includes a plurality of connecting portions 52 and a plurality of reinforcing portions 53. The outer end portion of the lower arm 51 in the vehicle width direction is defined as a first end portion 54. An end portion of the lower arm 51 on the center side in the vehicle width direction is defined as a second end portion 55.

The connecting portion 52 is basically mounted in the same manner as the connecting portion 42. Specifically, the connecting portion 52 is an elongated pipe material. At the first end portion 54, a plurality of connecting portions 52 are mounted to one location, i.e., the lower mounting plate 33b. The mounting points of the connecting portion 52 and the lower mounting plate 33b coincide with the steering shaft 101. The connecting portion 52 and the lower mounting plate 33b are coupled to each other so as to be rotatable relative to each other about the steering shaft 101. At the second end portion 55, the connecting portion 52 is mounted to the second end mounting portion 62 in a state in which the connecting portion 52 is spaced apart in the vehicle length direction. The connecting portion 52 and the second end mounting portion 62 are coupled to each other so as to be rotatable relative to each other about a predetermined direction, more specifically, a direction orthogonal to the steering shaft 101 in a side view.

In the present embodiment, at least a part of the steering transfer unit 61 is disposed between the two connecting portions 42 of the upper arm 41. Alternatively, at least a part of the steering transfer unit 61 may be disposed between the two connecting portions 52 of the lower arm 51.

The reinforcing portion 53 connects the intermediate portions of the plurality of connecting portions 52 disposed at intervals.

Hereinafter, the roll motion of the vehicle 1 will be described. Since the basic mechanism for realizing the roll motion is known as a conventional technique, the configuration specific to this embodiment will be described in detail. First, the roll axis 102, which is the rotation axis of the roll motion, will be described. For example, the present embodiment and the double wishbone suspension perform a roll motion using two arms as links. In this type of configuration, an intersection point of the extension lines of the two arms passes through the roll axis, or a point obtained by extending the intersection point in the vehicle width direction passes through the roll axis. The extension line of the arm means a line obtained by extending a line segment connecting connection points of both ends of the arm. Thus, the extension of the arm is essentially independent of the shape of the arm. Therefore, in the present embodiment, as shown in FIG. 2, the roll axis 102 passes through a point obtained by extending the intersection point 104 toward the center in the vehicle width direction. The intersection point 104 is an intersection point of a first imaginary straight line 111 passing through the first end portion 44 and the second end portion 45 of the upper arm 41 and a second imaginary straight line 112 passing through the first end portion 54 and the second end portion 55 of the lower arm 51. The roll axis 102 further passes through a contact point between the rear wheel 12 and the road surface. Therefore, as shown in FIG. 1, the roll axis 102 of the present embodiment is inclined up in front. In the present embodiment, the roll axis 102 is orthogonal to the steering shaft 101 in a side view. Further, the roll axis 102 passes below the steering handle 23, passes above the seat surface 22a of the seat 22, and passes through the back portion of the seat 22. The roll axis 102 passes above the front wheel 11.

As shown in FIG. 2, the center of gravity of the vehicle 1 (hereinafter the vehicle center of gravity 103) of the present embodiment is the same as the seating surface 22a of the seat 22 in a side view. Alternatively, the vehicle center of gravity 103 is lower than the seating surface 22a and higher than the lower end of the seat 22. The vehicle center of gravity 103 is above the floor on which the driver and the passenger places his/her feet, i.e., the surface on which the pedals and the like are disposed, and further above the axle positions of the front wheel 11 and the rear wheel 12. In the present specification, the vehicle center of gravity 103 is a center of gravity in a state in which the driver and the passenger are not on board. The weight of the occupant is generally much smaller than that of the vehicle. Therefore, even when the driver and the passenger is on board, the position of the vehicle center of gravity 103 does not change much. The roll axis 102 passes above the vehicle center of gravity 103.

Here, the behavior of the roll motion depends on the positional relationship between the roll axis 102 and the vehicle center of gravity 103. Specifically, the centrifugal force in the rotational coordinate system acts on the position of the vehicle center of gravity 103. Therefore, the inclination direction of the vehicle body 10 differs depending on the positional relationship between the roll axis 102 and the vehicle center of gravity 103. In a typical four-wheeled automobile, the roll axis is below the center of gravity of the vehicle. Therefore, at the time of turning, a force acts so that the vehicle body tilts outward in the turning direction. On the other hand, in the vehicle 1 of the present embodiment, the roll axis 102 is located at a position higher than the vehicle center of gravity 103. Therefore, at the time of turning, a force acts so that the vehicle body 10 is inclined inward in the turning direction.

Further, the vehicle body 10 of the present embodiment is configured to be tiltable when a force in the roll direction is applied. More specifically, the vehicle body 10 is connected to the front wheel mounting portion 30 via a rotatable link, i.e., the upper arm 41 and the lower arm 51. The first ends 44 and 54 of the upper arm 41 and the lower arm 51 are configured to be movable along the steering shaft 101 by expansion and shrink of the suspension 32. The second end portions 45 and 55 of the upper arm 41 and the connecting portion 52 rotate about a direction perpendicular to the steering shaft 101 by relative rotation with respect to the second end mounting portion 62 (as a result, the positions of the first end portions 44 and 54 change). With the above-described configuration, the vehicle body 10 is configured to be inclined with respect to the front wheel mounting portion 30, the front wheel 11, and the like. Therefore, when a force is applied to the vehicle body 10 in the turning direction by turning or the like of the vehicle 1, the vehicle body 10 performs a roll motion and inclines inward in the turning direction as shown in FIG. 4. In FIG. 4, a state of turning to the right side (left side in the drawing) when viewed from the driver is shown. The vehicle body 10 is a mechanism inclined with respect to the front wheel mounting portion 30. Therefore, the front wheel 11 maintains an upright position when turning. On the other hand, the rear wheel 12 is mounted to the vehicle body 10 so as to rotate integrally with the vehicle body 10. Therefore, the rear wheel 12 is inclined together with the vehicle body 10 at the time of turning.

When the vehicle body 10 is inclined inward in the turning direction, the seat 22 provided on the vehicle body 10 and the driver and the passenger (hereinafter occupant) are inclined in the same manner. As a result, the influence of the centrifugal force applied to the occupant can be alleviated by gravity. Therefore, it is possible to reduce the load on the occupant at the time of turning of the vehicle 1. Since the occupant tilts inward in the turning direction integrally with the vehicle body 10 at the time of turning, it is possible to realize a favorable driving feeling similar to that of a motorcycle or the like. In particular, in the present embodiment, the roll axis 102 passes above the seating surface 22a of the seat 22 and below the steering handle 23. Accordingly, in a side view, the roll axis 102 passes through or near the abdomen of the driver of the occupant seated on the seat 22. As a result, a more favorable driving feeling can be realized.

As shown in FIG. 2, a pair of left and right coupling springs 64 and a connecting link 66 are mounted to the roll mechanism 40.

The coupling spring 64 is disposed so as to connect the lower arm 51 and the vehicle body 10, more specifically, the frame 21. At the time of turning the vehicle 1, the vehicle body 10 is inclined, so that the positional relationship between the vehicle body 10 and the lower arm 51 is changed. In this case, the coupling spring 64 applies a biasing force in a direction to suppress a change in the positional relationship between the vehicle body 10 and the lower arm 51. As a result, it is possible to suppress the vehicle body 10 from being excessively inclined, i.e., the inclination angle becomes excessively large.

The coupling spring 64 is configured to be able to adjust an initial load. The initial load is a load applied to the coupling spring 64 in a state in which no external force is applied to the vehicle 1 (in other words, in a state in which the occupant is not riding). Accordingly, when a load exceeding the initial load is applied to the coupling spring 64, the coupling spring 64 expands and shrinks, in other words, the roll mechanism 40 operates to tilt the vehicle body 10. Therefore, it is possible to realize a structure in which the vehicle body 10 is not inclined when the driver rides, and the vehicle body 10 is inclined only when the vehicle 1 turns. The pair of left and right coupling springs 64 can also set respective initial loads. In the vehicle 1, the seats 22 are disposed side by side in the left and right directions. Therefore, when the seat 22 for the driver is used and the seat 22 for the passenger is not used, the initial load of the coupling spring 64 on the side on which the seat 22 for the driver is disposed, that is, on the left side in this embodiment, may be set larger than the initial load of the coupling spring 64 on the opposite side. As a result, it is possible to prevent inclination of the vehicle body 10 when the driver is riding, and to further improve the balance between the left and right sides while the vehicle 1 is traveling. In addition, by changing the initial load of the coupling spring 64, it is possible to realize a behavior according to the preference of the driver, such as the timing at which the inclination is started at the time of turning.

The coupling spring 64 is further configured to generate a damping force for damping vibration of the coupling spring 64. By damping the vibration of the coupling spring 64, the vibration of the vehicle body 10 can be reduced early after the inclination of the vehicle body 10 returns to the original state. The configuration for generating the damping force includes, for example, a rod that moves together with the coupling spring 64. Resistance can be generated by moving the rod in oil. The generated resistance force becomes a damping force.

For example, when the driver operates the operation member of the coupling spring 64, the initial load of the second end mounting portion 62 is changed. Alternatively, the initial load, the damping force, and the like of the coupling spring 64 may be changed at both traveling and stopping timings by operating the actuator by a controller (not shown). In this case, the initial load, the damping force, and the like of the coupling spring 64 are changed in accordance with the detection results of the various sensors included in the vehicle 1.

Note that the coupling spring 64 may be mounted at a position different from that of the present embodiment as long as the coupling spring 64 is at a position where the coupling spring 64 expands and shrinks when the vehicle body 10 is inclined. For example, the coupling spring 64 may be mounted to the upper arm 41 instead of the lower arm 51. One or more coupling springs 64 may be disposed on the vehicle body 10.

The connecting link 66 connects the pair of left and right lower arms 51. The connecting link 66 includes a pair of left and right bell crank mechanisms. The bell crank mechanism includes a first end, a second end, and a third end. The first end is rotatably connected to the frame 21 (front frame 70). The rotation of the bell crank mechanism about the first end changes the position of the second end and the third end. The second end of the bell crank mechanism is mounted to the roll mechanism 40 (lower arm 51) via a connecting rod. The third ends of the left and right bell crank mechanisms are connected to each other via connecting rods.

Figure 5:
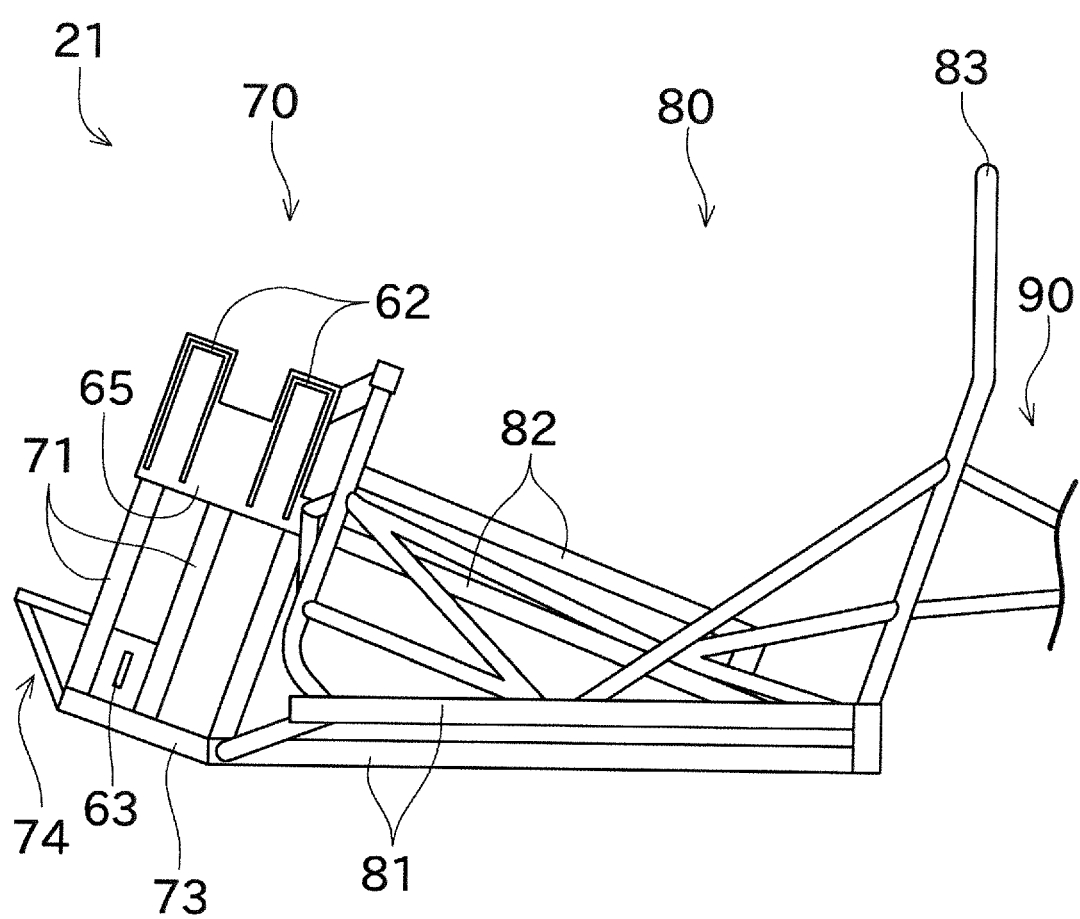
FIG. 5 is a side view of a frame.
Figure 6:
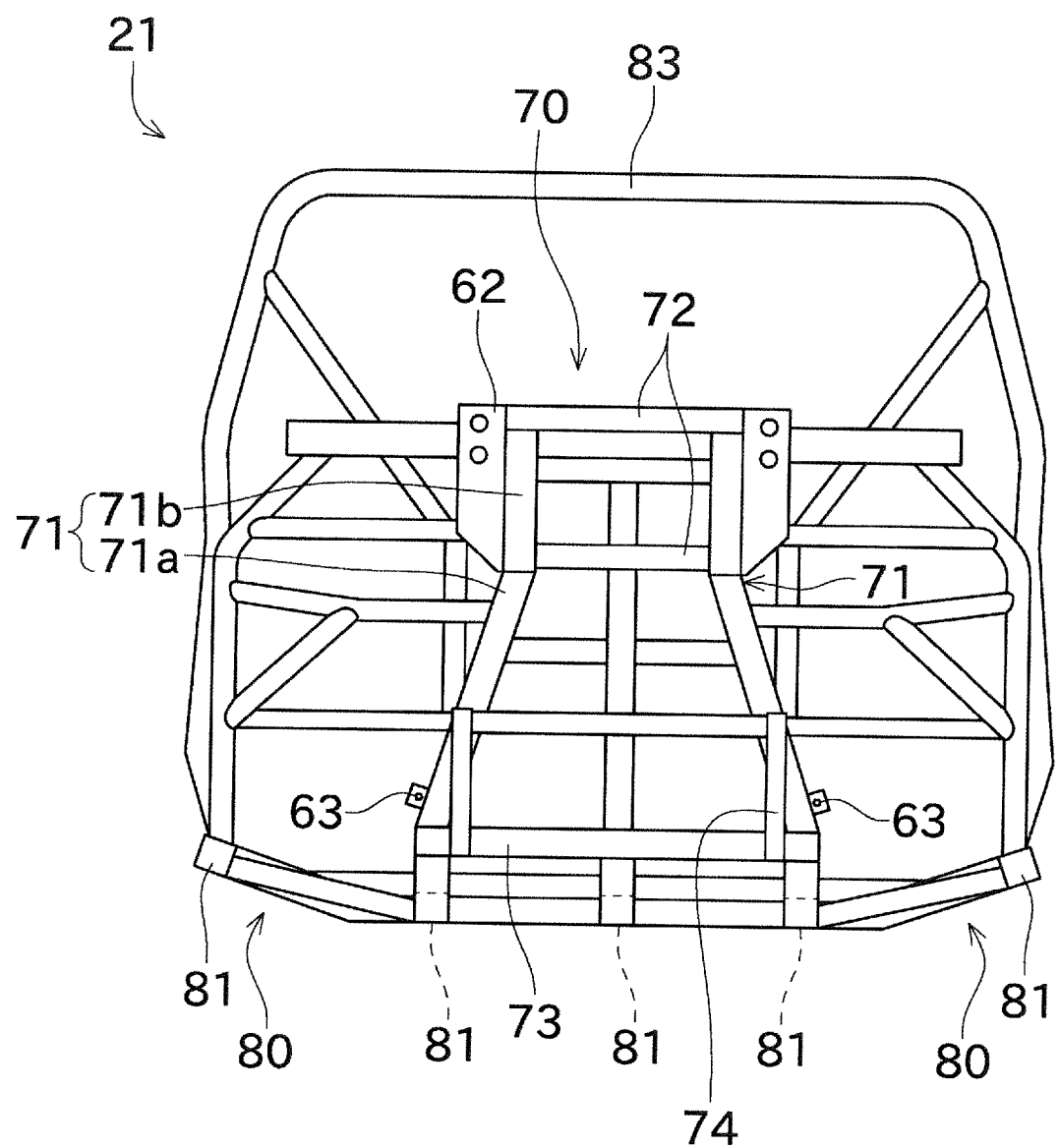
FIG. 6 is a front view of the frame.
Figure 7:
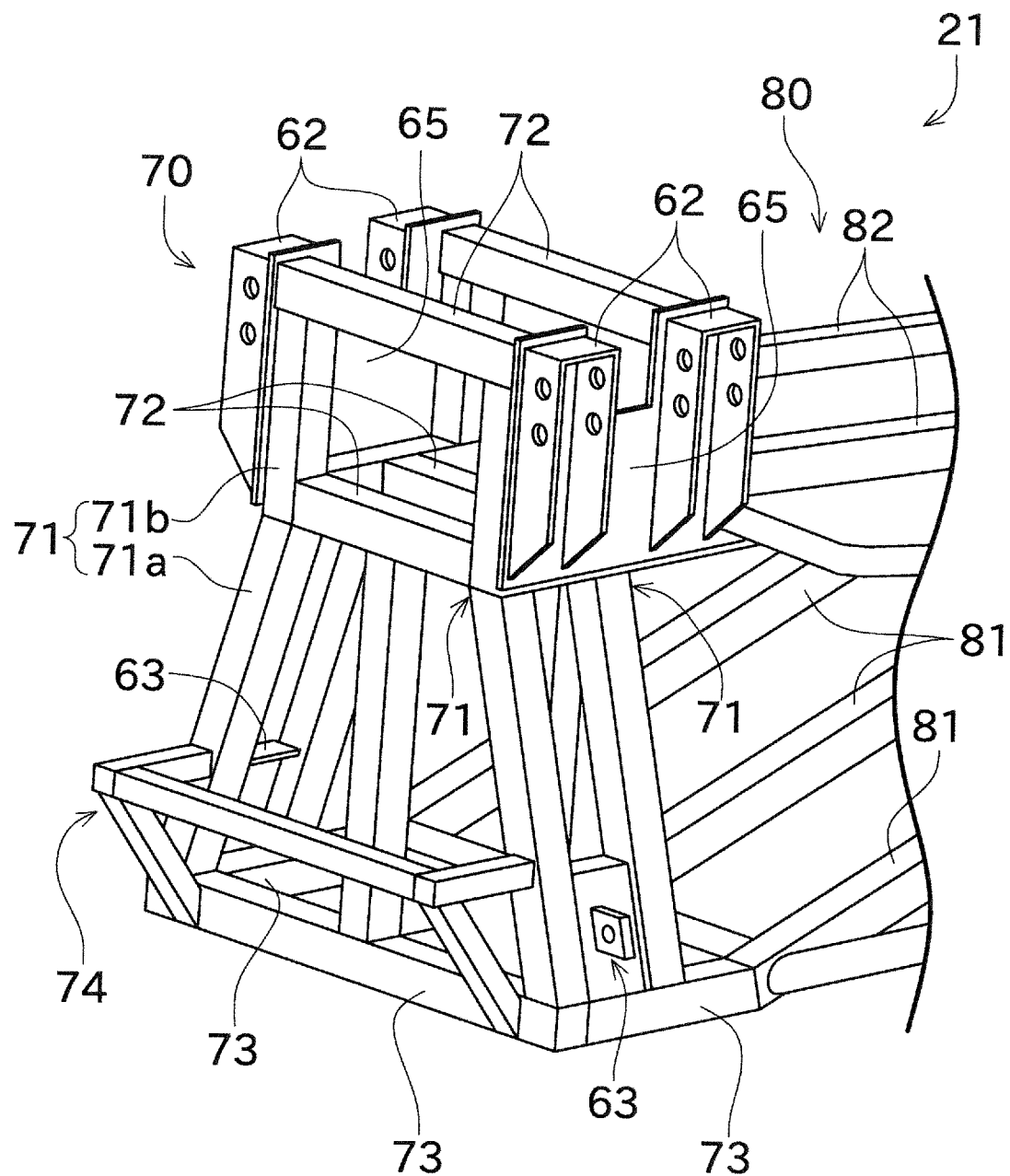
FIG. 7 is a perspective view of a front frame.

Next, the frame 21 will be described in detail with reference to FIG. 5 to FIG. 7. FIG. 5 is a side view of the frame 21. FIG. 6 is a front view of the frame 21. FIG. 7 is a perspective view of the front frame 70. The frame 21 includes a front frame 70, a center frame 80, and a rear frame 90.

The roll mechanism 40 is mounted to the front frame 70. The front frame 70 supports the front wheel mounting portion 30 and the roll mechanism 40. The front frame 70 is disposed forward of the boarding space, for example. The front frame 70 includes a first frame 71, a second frame 72, and a third frame 73.

The first frame 71 is a portion for mounting the second end mounting portion 62 and the coupling spring mounting portion 63. The first frame 71 is disposed so as to extend at least in the vertical direction (in other words, the longitudinal component of the first frame 71 includes the vertical component). The first frame 71 includes a lower frame 71a and an upper frame 71b.

The first frame 71 of the present embodiment includes four lower frames 71a. The two lower frames 71a are disposed side by side in the vehicle length direction, more specifically, in a direction slightly inclined with respect to the vehicle length direction, or in a direction orthogonal to the steering shaft 101. The two lower frames 71a are disposed side by side in the left-right direction. A coupling spring mounting portion 63 is mounted between two lower frames 71a disposed side by side in the vehicle length direction. The coupling spring mounting portion 63 is a member for mounting an end portion of the coupling spring 64 on the vehicle body 10 side. The lower frame 71a is disposed so as to be inclined with respect to the upper frame 71b. As a result, the strength can be increased. The disposal direction (longitudinal direction) of the lower frame 71a and the upper frame 71b may be the same.

The upper frame 71b is connected to the upper ends of the four lower frames 71a. Therefore, a total of four upper frames 71b are disposed in the same manner as the lower frame 71a. The second end mounting portion 62 is mounted to two upper frames 71b disposed side by side in the vehicle length direction. Specifically, one mounting plate 65 is mounted to each end of the two upper frames 71b in the vehicle width direction. Two second end mounting portions 62 are mounted to the mounting plate 65 side by side in the vehicle length direction. In the mounting plate 65, a notch for allowing the steering transfer unit 61 to pass therethrough is formed between the two second end mounting portions.

The second frame 72 connects the first frames 71 disposed in a left-right pair, that is, the second end mounting portions 62. The second frame 72 is disposed so as to extend at least in the vehicle width direction (in other words, the longitudinal component of the second frame 72 includes the vehicle width direction). Four second frames 72 are disposed. The two second frames 72 connect the upper ends of the upper frames 71b to each other. The remaining two second frames 72 connect the lower ends of the upper frame 71b. Therefore, the second frame 72 is disposed side by side in the vertical direction (in other words, in a direction slightly inclined with respect to the vertical direction, or in a direction parallel to the steering shaft 101).

The third frame 73 is a portion for connecting the lower ends of the four first frames 71. The third frame 73 is composed of, for example, four members disposed in a rectangular shape. The lower end of the first frame 71 is connected to the third frame 73. A reinforcing frame 74 is connected to a front portion of the third frame 73. The reinforcing frames 74 are disposed in a left-right pair. The reinforcing frame 74 is connected to an intermediate portion of the first frame 71. The pair of left and right reinforcing frames 74 are connected to each other.

The center frame 80 supports the sheet 22 and the like. The center frame 80 is disposed, for example, in a riding space. The center frame 80 includes a horizontal frame 81, an inclined frame 82, and a room frame 83.

The horizontal frame 81 is disposed so as to extend the position of the bottom portion of the vehicle body 10 in the vehicle length direction. The horizontal frames 81 are disposed side by side in the vehicle width direction. However, as shown in FIG. 5 and FIG. 6, the height of the horizontal frame 81 disposed outside in the vehicle width direction is higher than the height of the horizontal frame 81 disposed inside in the vehicle width direction. This makes it difficult for the horizontal frame 81 to come into contact with the road surface when the vehicle body 10 is inclined. When the vehicle body 10 includes a body shell such as a side panel, it is preferable that the body shell has a similar shape, that is, a shape that approaches upward as it approaches the outside in the vehicle width direction.

The inclined frame 82 is disposed so as to pass through the riding space, in particular, so as to pass between the pair of left and right seats 22. The inclined frame 82 is disposed above the horizontal frame 81. The inclined frame 82 is disposed so as to extend forward and backward. The inclined frame 82 is inclined so as to approach downward as it approaches rearward. By providing the inclined frame 82 in addition to the horizontal frame 81, the strength in the torsional direction can be improved. In particular, the inclined frame 82 of the present embodiment is disposed in parallel with the roll axis 102, including a difference of about several degrees. Further, the inclined frame 82 is disposed at a relatively high position, for example, at a position where the front end of the inclined frame 82 is above the seating surface 22a. Therefore, the strength in the torsional direction can be further improved.

The room frame 83 is a frame that partitions a riding space. The room frame 83 is provided, for example, behind the seat 22.

The rear frame 90 is a portion that supports the engine 25 and to which the rear wheel 12 is mounted. The rear frame 90 is disposed rearward of the riding space, for example.

As thus far described, the vehicle 1 of the present embodiment includes the front wheels 11, the front wheel mounting portions 30, the vehicle body 10, and the roll mechanism 40. The front wheels 11 comprise the pair of left and right front wheels. Each of the front wheels 11 are rotatable about the steering shaft 101 as a rotation center. The front wheel mounting portions 30 comprise the pair of left and right front wheel mounting portions. The front wheel mounting portions 30 are rotatably mounted with the front wheels 11 and the front wheel mounting portions include a suspension 32. The vehicle body 10 includes a seat 22 on which an occupant sits. The roll mechanism 40 connects the vehicle body 10 and the front wheel mounting portions 30. When the vehicle 1 stands upright, the roll axis 102 of the roll mechanism 40 is located at a position higher than the vehicle center of gravity 103 1 on which the occupant is not riding. When only the vehicle body 10 among the vehicle body 10 and the front wheels 11 rotates around the roll axis as a rotation center by receiving centrifugal force at the timing of turning of the vehicle 1. As a result, the vehicle body 10 is inclined inward in the turning direction.

Since the roll axis 102 is located at a position higher than the vehicle center of gravity 103, the vehicle body 10 is inclined inward in the turning direction when the vehicle 1 turns. As a result, the force applied to the driver at the time of turning can be reduced, so that the load on the driver can be reduced.

The roll mechanism 40 of the vehicle 1 of the present embodiment includes the pair of left and right upper anus 41 and the pair of left and right lower arms 51. Each of the first end portions 44, 54 on the outer side in the vehicle width direction of the upper arms 41 and the lower arms 51 are mounted to the front wheel mounting portion 30. Each of the second end portions 45, 55 on the center side in the vehicle width direction of the upper arms 41 and the lower arms 51 are rotatably mounted to the vehicle body 10.

Accordingly, the roll mechanism 40 can be realized by using a total of four arm links.

The roll axis 102 of the vehicle 1 of the present embodiment passes through an intersection point 104 in which the upper arm 41 and the lower arm 51 are extended toward the center in the vehicle width direction. Alternatively, the roll axis 102 passes through a point obtained by extending the intersection point 104 in the vehicle width direction. In a front view, the intersection point 104 is located at a position higher than the vehicle center of gravity 103.

Accordingly, since the position of the roll axis 102 can be easily specified, it becomes easy to estimate the behavior at the time of turning at the design stage.

The front wheel mounting portion 30 of the vehicle 1 of the present embodiment includes the suspension 32 and the first end mounting portion 33. The first end portion 44 of the upper arm 41 and the first end portion 54 of the lower arm 51 are mounted to the first end mounting portion 33 at a position higher than the upper end of the front wheel 11.

By arranging the upper arm 41 and the lower arm 51 at high positions, the roll axis 102 is easily raised. Therefore, it is easy to realize a configuration in which the roll axis 102 is higher than the vehicle center of gravity 103.

The vehicle 1 of the present embodiment includes the steering handle 23 and the steering transfer unit 61. The steering transfer unit 61 transmits the operating force applied to the steering handle 23 to the front wheel mounting portion 30 so that the front wheel 11 rotates around the steering shaft 101 as a rotation center. The upper arm 41 includes two connecting portions 42 which are disposed so as to be spaced apart from each other in the vehicle length direction. At least a part of the steering transfer unit 61 is disposed between the two connecting portions 42.

Accordingly, the arm and the steering transfer unit 61 can be disposed by effectively utilizing the space.

In the vehicle 1 of the present embodiment, the roll axis 102 passes above the seating surface 22a of the seat 22 and below the steering handle 23.

Since the roll axis 102 passes near the center of the driver's body, a preferable driving feeling can be realized.

The vehicle 1 of the present embodiment includes a coupling spring 64 that couples the lower arm 51 and the vehicle body 10. The coupling spring 64 extends or shrinks when the vehicle body 10 is inclined.

Accordingly, the inclination angle at the time of turning of the vehicle 1 can be suppressed.

The coupling springs 64 of the vehicle 1 of the present embodiment comprises the pair of left and right coupling springs. The initial load of each of the pair of left and right coupling springs 64 can be changed separately.

Thus, by changing the initial load in accordance with various circumstances, it is possible to realize setting in accordance with the environment and the requirements of the occupant.

The vehicle body 10 of the vehicle 1 of the present embodiment includes the pair of left and right second end mounting portions 62, the pair of left and right coupling spring mounting portions 63, and the pair of left and right first frames 71. The second end portions 45, 55 of each of the upper arms 41 and the lower anus 51 is mounted to each of the second end mounting portions 62. The coupling spring 64 is mounted to the coupling spring mounting portion 63. The first frame 71 connects the second end mounting portion 62 and the coupling spring mounting portion 63. The first frame 71 extends at least in the vertical direction.

A large load is applied to a portion to which the coupling spring 64, the upper arm 41, and the lower arm 51 are mounted when the vehicle body 10 is inclined. Therefore, by reinforcing these members with the first frame 71, it is possible to improve the resistance to the load.

A plurality of first frames 71 of the vehicle 1 of the present embodiment are disposed side by side in the vehicle length direction.

By arranging the first frame 71 side by side in the vehicle length direction, a large load applied to the first frame 71 can be dispersed.

The vehicle body 10 of the vehicle 1 of the present embodiment includes a second frame 72 that connects each of the pair of left and right second end mounting portions 62. The second frame 72 extends at least in the vehicle width direction.

Since the second end mounting portion 62 is a fulcrum of the link, a strong load is applied particularly when the vehicle body 10 is inclined. Therefore, by reinforcing the second end mounting portion 62 with the second frame 72, it is possible to cope with this load.

The plurality of second frames 72 of the vehicle 1 of the present embodiment are disposed side by side in the vertical direction.

By arranging the second frames 72 side by side in the vertical direction, a large load applied to the second frames 72 can be dispersed.

The vehicle body 10 of the vehicle 1 of the present embodiment includes the horizontal frame 81 and the inclined frame 82. The horizontal frame 81 extends horizontally in the vehicle length direction at the position of the bottom of the vehicle body 10. The inclined frame 82 is inclined with its rear portion being more downward.

By providing two frames having different angles, the strength in the torsional direction can be improved.

The lower portions of both end portions in the vehicle width direction of the vehicle body 10 of the present embodiment are inclined with its out portion in the vehicle width direction being more upward in front view.

Even when the vehicle body 10 is inclined, the vehicle body 10 hardly comes into contact with the road surface.

Although the preferred embodiment of the present invention has been described above, the above configuration can be modified, for example, as follows.

In the above embodiment, the first end mounting portion 33 is disposed at a position higher than the upper end of the front wheel 11.

However, the first end mounting portion 33 may be disposed at a lower position than the first end mounting portion 33. In this case, in order to raise the roll axis 102, for example, the angles of the upper arm 41 and the lower arm 51 are increased in the center, i.e., the heights are increased toward the center. As a result, since the position of the roll axis 102 can be increased, the roll axis 102 can be easily made higher than the vehicle center of gravity 103.

The shapes of the frame 21 and the roll mechanism 40 of the present embodiment are examples and may be different from those of the present embodiment. In the present embodiment, a reinforcing portion 43 and a reinforcing portion 53 are provided in order to secure necessary strength. However, when necessary strength can be secured, the reinforcing portion 43 and the reinforcing portion 53 may be omitted.

What is claimed is:

1. A vehicle, comprising:
   a pair of left and right front wheels each being rotatable about a steering shaft as a rotation center;
   a pair of left and right front wheel mounting portions, each of the portions being rotatably mounted with each of the front wheels, each of the portions including a suspension;
   a vehicle body including a seat on which an occupant sits;
   a pair of left and right upper minis;
   a pair of left and right lower arms; and
   a roll mechanism connecting the vehicle body and the portions,
   wherein when the vehicle stands upright, a roll axis of the roll mechanism is located at a position higher than a center of gravity of the vehicle on which the occupant is not riding,
   wherein only the vehicle body among the vehicle body and the front wheels rotates around the roll axis as the rotation center by receiving a centrifugal force at a timing of turning of the vehicle,
   wherein each of first end portions of an outer side in a vehicle width direction of the upper arms and the lower arms is mounted to a corresponding one of the portions, and
   wherein each of second end portions of a center side in the vehicle width direction of the upper arms and the lower arms is rotatably mounted to the vehicle body.

2. The vehicle according to claim 1, wherein the roll axis passes through an intersection point in which the upper arm and the lower arm are extended toward the center side in the vehicle width direction or the roll axis passes through a point obtained by extending the intersection point in the vehicle width direction and wherein, in a front view, the intersection point is located at a position higher than the center of gravity of the vehicle.

3. The vehicle according to claim 1, wherein each of the portions includes a first end mounting portion to which the first end portion of the upper arm and another first end portion of the lower arm are mounted at a position higher than the upper end of the front wheel.

4. The vehicle according to claim 1, further comprising:
   a steering handle, and
   a steering transfer unit transmitting an operating force applied to the steering handle to the front wheel mounting portion so that the front wheel rotates around the steering shaft as a rotation center,
   wherein at least one of the upper arm and the lower arm includes two connecting portions that are disposed so as to be spaced apart from each other in a vehicle length direction and
   wherein at least a part of the steering transfer unit is disposed between the two connecting portions.

5. The vehicle according to claim 4, wherein the roll axis passes above a seating surface of the seat and below the steering handle.

6. The vehicle according to claim 1, further comprising:
   a coupling spring coupling at least one of the upper arm and the lower arm on the vehicle body,
   wherein the coupling spring extends or shrinks when the vehicle body is inclined.

7. The vehicle according to claim 6, wherein the coupling springs includes a pair of left and right coupling springs and wherein an initial load of each of the pair of left and right coupling springs can be changed separately.

8. The vehicle according to claim 6, wherein the vehicle body includes:
   a pair of left and right second end mounting portions to which the second end portion of the upper arm in and the second end portion of the lower arm are mounted,
   a pair of left and right coupling spring mounting portions to which the coupling spring is mounted, and
   a pair of left and right first frames that extends at least in a vertical direction and connects the second end mounting portion and the coupling spring mounting portion.

9. The vehicle according to claim 8, wherein a plurality of the first frames are disposed side by side in the vehicle length direction.

10. The vehicle according to claim 8, further comprising:
    a second frame extending at least in the vehicle width direction and connects both of the pair of left and right second end mounting portions.

11. The vehicle according to claim 10, wherein a plurality of the second frames are disposed side by side in the vertical direction.

12. The vehicle according to claim 1, wherein the vehicle body includes:
    a horizontal frame extending horizontally in a vehicle length direction at the position of the bottom of the vehicle body, and
    an inclined frame inclined with its rear portion being more downward.

13. The vehicle according to claim 1, wherein lower portions of both end portions in the vehicle width direction of the vehicle body are inclined with its out portion in the vehicle width direction being more upward in front view.

* * * * *